United States Patent
Gupta

(10) Patent No.: US 12,085,783 B2
(45) Date of Patent: Sep. 10, 2024

(54) EYEWEAR AFFIXABLE CUSHION

(71) Applicant: OCUCLIPS LLC, Ellicott City, MD (US)

(72) Inventor: Mohil Gupta, Ellicott City, MD (US)

(73) Assignee: OCUCLIPS LLC., Ellicott City, MD (US)

( * ) Notice: Subject to any disclaimer, the term of this patent is extended or adjusted under 35 U.S.C. 154(b) by 383 days.

(21) Appl. No.: 17/383,931

(22) Filed: Jul. 23, 2021

(65) Prior Publication Data

US 2022/0026738 A1 Jan. 27, 2022

Related U.S. Application Data

(60) Provisional application No. 63/056,199, filed on Jul. 24, 2020.

(51) Int. Cl.
*G02C 5/14* (2006.01)
(52) U.S. Cl.
CPC ........... *G02C 5/14* (2013.01); *G02C 2200/08* (2013.01)
(58) Field of Classification Search
CPC .............................. G02C 5/14; G02C 2200/08
USPC .......................................................... 351/122
See application file for complete search history.

(56) References Cited

U.S. PATENT DOCUMENTS

| | | |
|---|---|---|
| 2,502,734 A | 8/1947 | Lyons |
| 3,993,403 A | 11/1976 | Brown |
| 4,729,650 A | 3/1988 | Jennings |
| 4,818,094 A | 4/1989 | Lyons |
| 5,004,333 A * | 4/1991 | Bruhl, Jr. .................. A61F 9/00 128/858 |
| 5,087,118 A | 2/1992 | Gill |
| 5,157,425 A | 10/1992 | Liu |
| 5,287,559 A | 2/1994 | Christiansen et al. |
| 5,359,370 A * | 10/1994 | Mugnier ................ G02C 11/08 351/111 |
| 5,440,355 A | 8/1995 | Ross |
| 5,517,695 A | 5/1996 | Murray |
| 6,059,408 A * | 5/2000 | Bonacci ................. G02C 11/00 351/62 |
| 6,065,834 A * | 5/2000 | Willhite .................... G02C 5/00 351/122 |
| 6,322,149 B1 | 11/2001 | Conforti et al. |
| D576,199 S | 9/2008 | Mosley et al. |

(Continued)

FOREIGN PATENT DOCUMENTS

WO     2012/088063     6/2012

OTHER PUBLICATIONS

YR Soft Silicone Eyeglasses Temple Tips Sleeve Retainer,Anti-Slip Elastic Comfort Glasses Retainers for Spectacle Sunglasses Reading Glasses Eyewear,5 pairs—Gray (Access Info on Document).

(Continued)

*Primary Examiner* — Sharrief I Broome
(74) *Attorney, Agent, or Firm* — PATENT PORTFOLIO BUILDERS PLLC

(57) ABSTRACT

An eyewear affixable cushioning device may include a base member including a first area and a second area, a fastener disposed on at least one of the first area and the second area of the base member, and a non-slip surface being disposed on the base member. The base member may include a compressible material. Additional devices, systems, and methods are disclosed.

12 Claims, 8 Drawing Sheets

(56) References Cited

U.S. PATENT DOCUMENTS

| | | | |
|---|---|---|---|
| D628,230 S | 11/2010 | Tobey | |
| 8,272,076 B2 | 9/2012 | Tobey | |
| D684,623 S | 6/2013 | Tobey | |
| D753,213 S | 4/2016 | Spampinato | |
| D761,346 S | 6/2016 | Spampinato | |
| 9,651,798 B1* | 5/2017 | Fujimura | G02C 5/12 |
| D791,219 S | 7/2017 | Lawrence et al. | |
| 2010/0071118 A1 | 3/2010 | Tobey | |
| 2011/0088820 A1 | 4/2011 | Khuri et al. | |
| 2014/0041091 A1* | 2/2014 | Sternlight | A61F 9/04 2/12 |
| 2014/0331383 A1* | 11/2014 | Bially | A61F 9/04 2/173 |
| 2016/0008175 A1* | 1/2016 | Bergman | A61F 9/04 2/171.2 |
| 2017/0100287 A1* | 4/2017 | Calilung | A61F 9/026 |
| 2017/0146816 A1* | 5/2017 | Chen | G02C 3/006 |

OTHER PUBLICATIONS

Soft Eyeglass Temple Tip Sleeves Add Color and Comfort to Eyewear for Men, Women & Kids—Two Pack (Access Info on Document).

Soft Eyewear Temple Arm Cover Sleeves Add Colors & Comfort Eyeglasses Sunglasses for Men, Women & Kids 2 Sizes (Access Info on Document).

Friction Sleeve (Access Info on Document).

Eyeglass End Tips, 10 Pairs Silicone Anti-Slip Ear Sock Pieces Tube Sleeve Eyewear Soft Replacement Tips for Thin Wired Eyeglass Sunglasses Legs(5colors) (Access Info on Document).

LMP Optical Supply Eyeglass Wrap Around Cable Temple Conversion Kit (Access Info on Document).

Kickstarter post entitled "SightLines: Headset Cushions with Zero Eyewear Interference," pp. 1-34, Created by Noisefighters, retrieved from Internet Aug. 10, 2020, https://www.kickstarter.com/projects/noisefighters/sightlines-headset-cushions-with-zero-eyewear-inte?ref=discovery&term=headset.

* cited by examiner

EYEWEAR AFFIXABLE CUSHION

BACKGROUND

1. Technical Field

An embodiment relates to an eyewear affixable cushion.

2. Discussion of the Related Art

Eyewear wearers may experience a number of issues while wearing their eyewear (e.g., eyewear including frames), whether they be protective glasses, sunglasses, prescription frames, etc. One of the biggest problems for eyewear wearers is that when they wear their eyewear including frames, immense discomfort may be experienced while wearing any sort of headgear (which may include on-ear headphones, helmets, outerwear etc.).

The headgear along with the eyewear frames may push the wearer's frames behind the ear into the back of one's ear and into the side of one's head (e.g., temple). As a result, the user experience may be problematic. For example, a user may experience headaches due to the pressure felt at the temporal bone from the frames, and sore ear cartilage or auricular chondritis due to pressure from prolonged wearing of both headgear and eyewear frames.

Individuals currently attempt to address these problems in a number of unorthodox ways such as cutting gaps in headphone cushions and stuffing tissues behind the ear.

In today's society, with proliferating technology, individuals are more—now than ever wearing eyewear frames with headgear especially with the rise of the Esports industry and COVID times.

In view of the above, it is clear that there is a need for a sustainable and realistic solution to the above and other related problems.

This background section is intended to provide context and may contain recognitions not part of the knowledge of those of ordinary skill in the art as of the effective filing date of this disclosure and is not admitted prior art.

SUMMARY

According to an embodiment, an eyewear affixable cushioning device may include a base member including a first area and a second area, a fastener disposed on at least one of the first area and the second area of the base member, and a non-slip surface being disposed on the base member. The base member may include a compressible material.

Additional devices, systems, and methods are disclosed.

BRIEF DESCRIPTION OF THE DRAWINGS

The above and other features of the disclosure will become more apparent by describing in detail embodiments thereof with reference to the attached drawings, in which.

DETAILED DESCRIPTION OF THE EMBODIMENTS

Figure 1:
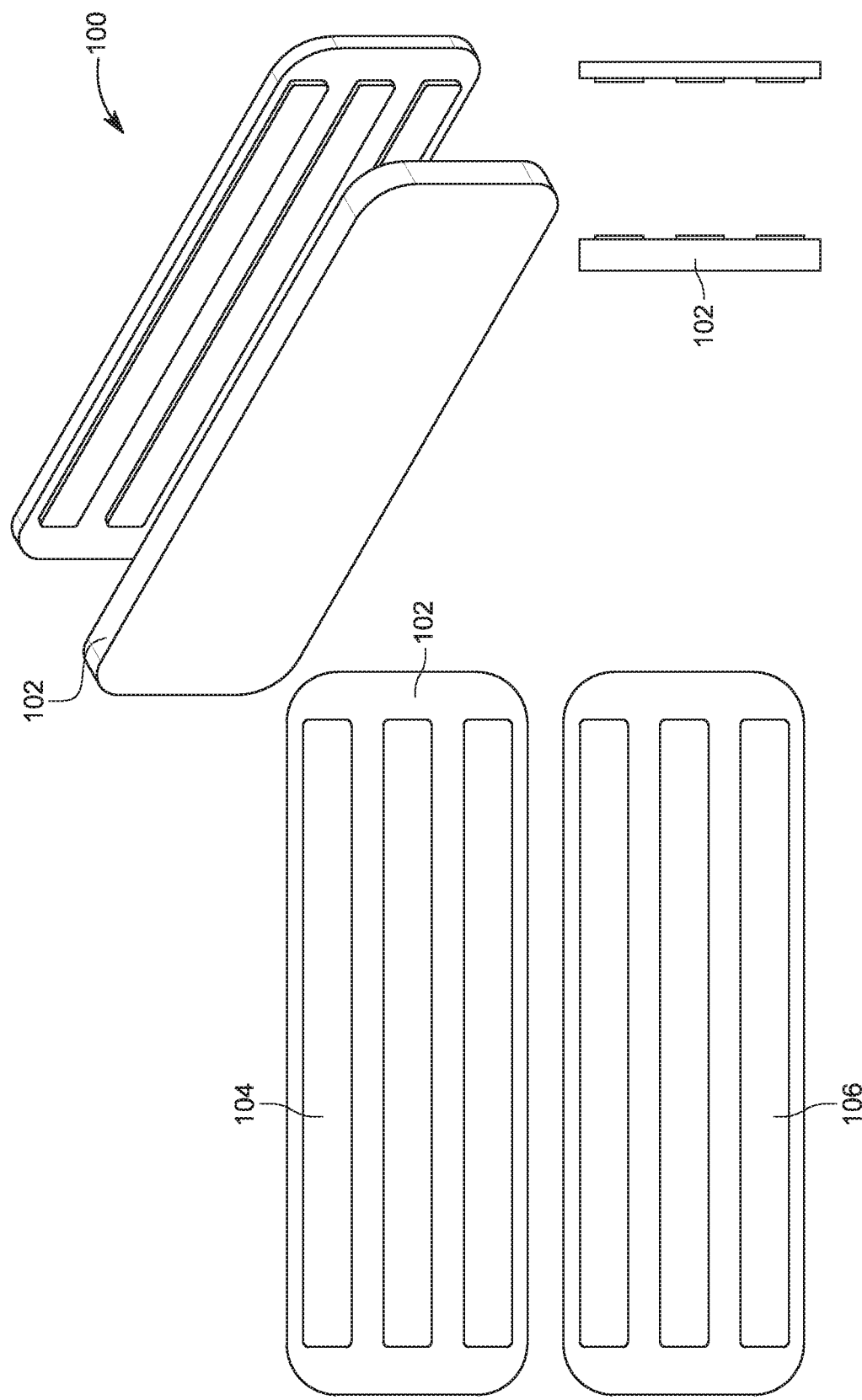
FIG. 1 provides schematic illustrations of an eyewear affixable cushioning device according to an embodiment.

In the following description, for purposes of explanation and non-limitation, specific details are set forth in order to provide an understanding of the described embodiments. It will be apparent to one skilled in the art that other embodiments may be practiced apart from the specific details disclosed below. In other instances, detailed descriptions of well-known methods, devices, techniques, etc. are omitted so as not to obscure the description with unnecessary detail.

Herein, references to a single feature are intended to capture the plural form (and vice versa), unless the context clearly indicates otherwise. The phrase "and/or" is intended to include one or more of the listed features. The terms "and" or "or" are intended to be treated similarly to "and/or". The terms "about" and "approximately" are intended to include the stated value or values, and deviations therefrom as would be appreciated by one of ordinary skill in the art.

According to an embodiment, a universal/adjustable to virtually all eyewear frames clip-on cushioned attachment may be provided, that is, an eyewear affixable cushion (also referred to as an eyewear affixable cushioning device) may be provided. The eyewear affixable cushion may alleviate user discomfort (particularly to the back of the ear and temple) when he/she wears a form of headgear (which may include over/on the ear headphones, helmets, earmuffs, beanies, and the like).

In order to create the invention, a number of in-depth prototypes are being created, materials are being tested, and scientific tests are being administered. These scientific tests include but are not limited to discovering the greatest compression a headphone/helmet may experience (e.g., approximate pounds of force) and measuring the effect of force against a variety of different internal materials to effectively determine and source a sufficient padded material that may maximize comfort but minimize thickness of the product. These tests are integral to developing product thickness and material specifications. There are also multiple tests being performed regarding the dimensions of the human ear as no human ear is the same, the average distance between the back of one's ear and head is taken account of as well as the smallest distance (for users with small ears) of the back of one's ear and head is taken account of in product development in order to develop a thickness that may be universal to all users. The outside of the material is meant to be comfortable but fairly moisture wicking due to the high probability of user's sweating onto the product when they are wearing it for long durations (e.g., multiple hours at a time) and during activities (e.g., long-term gaming). The design is being iterated multiple times in order to develop a solution that provides enough comfort for the user at appropriate (e.g., all) pain points, is universally adjustable to all eyewear frame sizes/thickness/dimensions', is manufacturable and inexpensive (e.g., a design may be flat and may not require a mold), and does not slip off frames when users remove headgear. Further, the device may not slip off frames when the user removes frames, even when wearing headgear.

FIGS. 1-4 include schematic illustrations of differing aspects of example embodiments.

FIG. 1 provides schematic illustrations of an eyewear affixable cushioning device 100 according to an embodiment. This embodiment showcases a two-part design for each glasses frame (a pair may be 4 parts) which may be interlined with fasters 104, 106 such as strips of thin magnetic material in order to attract one another through and/or around the glasses frame (to affix the device onto the frames). This embodiment may include a base member 102 and fasteners 104, 106 that may be made out of a combination of pre-molded plastic, carbon elements, polymers, metal components, and/or a compressible material such as a foam-type material that may provide comfort to the user.

The fasteners 104, 106 (e.g., metal linings) may be affixed on the inside and may be affixed to the device 100 through a number of fastening techniques. This design, however, may provide challenges as the device may come lose if magnetic attraction is lost. Additionally, due to a desired minimal thickness of the magnets utilized, it may be difficult to find magnets that may elicit enough magnetic attraction for the frames. Lastly, due to the inner lining of magnetic parts on the inside, the product may offer less cushioning to a user given the 'hard' inner core. Moreover, users may be likely to be more susceptible to losing their devices (e.g., one of the parts) as there are 4 parts in total for this design, for a pair.

Figure 2:
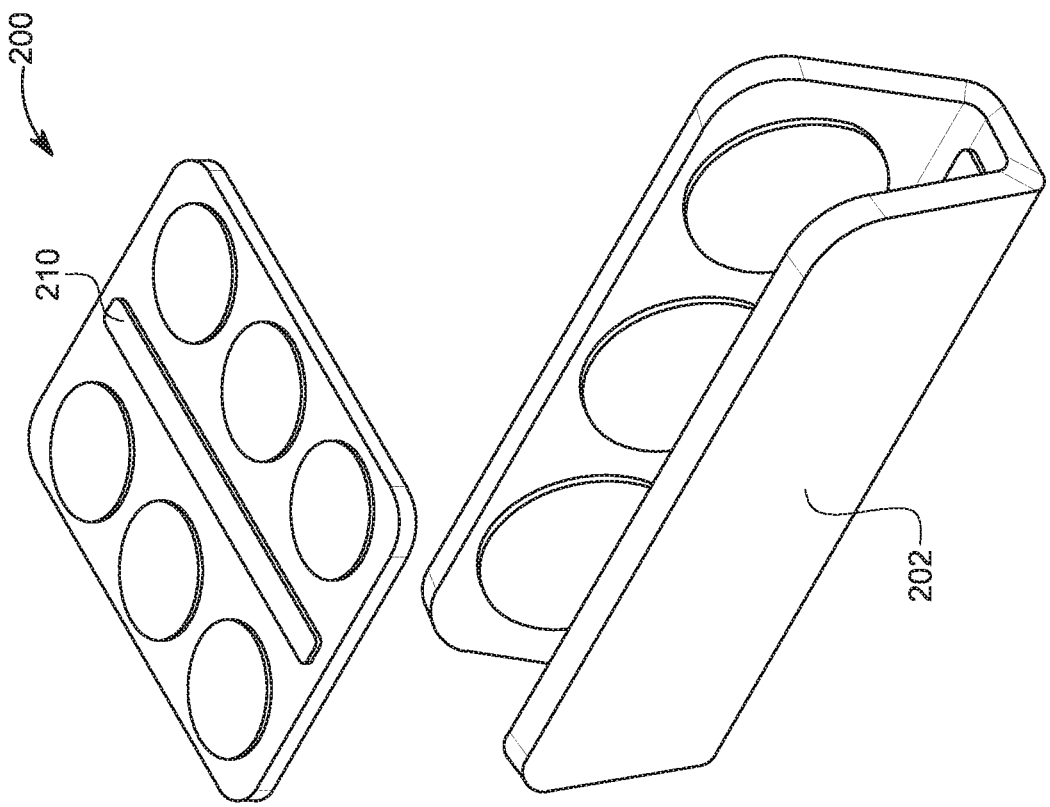
FIG. 2 provides schematic illustrations of an eyewear affixable cushioning device according to an embodiment.
Figure 2:
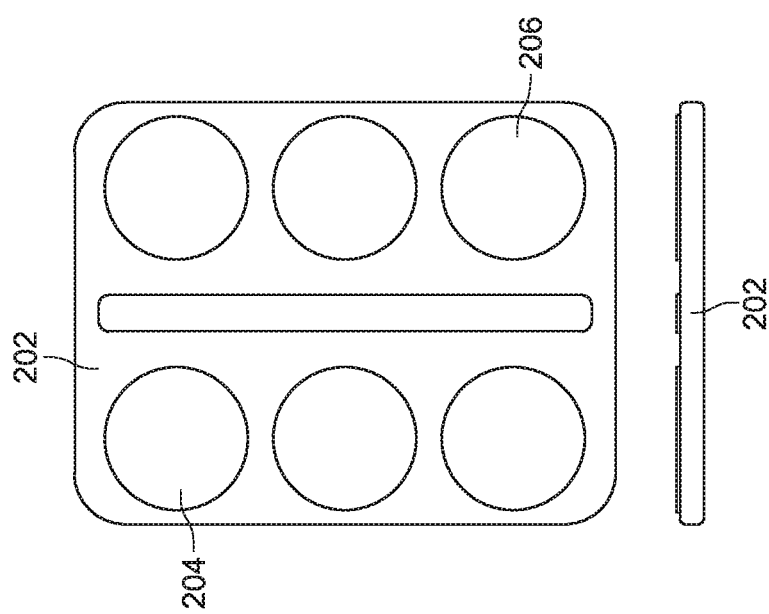

FIG. 2 provides schematic illustrations of an eyewear affixable cushioning device 200 according to an embodiment. The embodiment shown in the design also demonstrates fasteners 204, 206 such as magnets featuring a magnetic capability but with one part per frame (2 parts per pair). This device 200 may include base members 202 that may be interlined with fasteners 204, 206 such as circle shaped (though it can be a variety of different shapes or sizes) thin magnets/thin polymer material with magnetic properties (e.g., magnetic tape) in order to have an attachment part be attracted through a glasses frame in order to remain affixed. This embodiment may be utilized by the user by placing the device 200 underneath the glasses frames and positioning the frames above a non-slip surface 210. Then the user may fold the device 200 in order to cause the fasteners 204, 206 (e.g., inner linings of magnets) to attract to one another through and/or around the glasses frame. The challenges with magnets within this embodiment may be the same as mentioned in the prior embodiment 100 in FIG. 1. In terms of the material utilized, the base member 202 and the fasteners 204, 206 of the device 200 can include a pre-molded plastic, carbon elements, polymers, metal components, and/or foam-type material.

Figure 3:
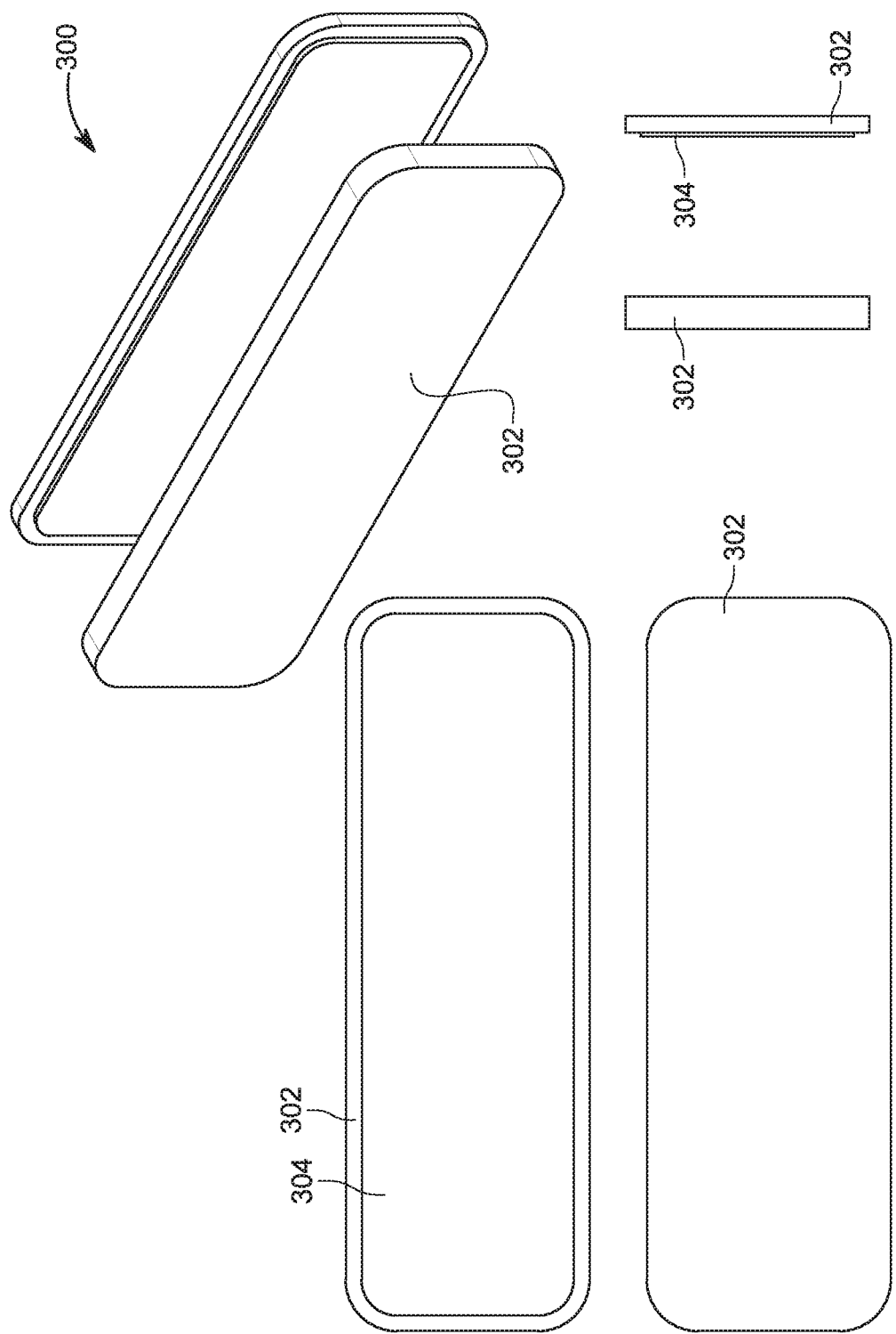
FIG. 3 provides schematic illustrations of an eyewear affixable cushioning device according to an embodiment.

FIG. 3 provides schematic illustrations of an eyewear affixable cushioning device 300 according to an embodiment. This figure shows a two-part device per glasses frame (4 parts per pair or system). This device 300 may be made from pre-molded plastic, carbon elements, polymers, metal components, and/or foam-type materials in order to provide comfort. On the inside of the product, there may be residue-sticky type material 304 (i.e., fastener) that may be interlined along the material (i.e., one or more base members 302) that the device may be formed of. A user may use this product by attaching each piece of the attachment to a side of the glasses frame. The adhesive residue provided on the inside of the product may allow for the glasses attachment to stick to the glasses frame; each side of the glasses frame may be encompassed with the glasses attachment, for both sides. This residue-sticky type material 304 (i.e, fastener) may be able to be re-used by the user, though he or she may notice a decrease in quality of the material and may have to purchase another pair. In another embodiment, residue-sticky type material may not be able to be re-used by the user. In such an embodiment, multi-packs (e.g., 10 products) that may not be reusable may supplied to a customer, and once a customer removes the device, the consumer may have to use the next pair. Such an embodiment would be a 'non-reusable' version. A user using such embodiments also may or may not need to clean their glasses frames after use if the sticky residue remains thereon. Additionally, this design may be prone to loss as there may be 4 components, just as discussed in conjunction with the embodiment 100 of FIG. 1. In terms of the material utilized, it can be a pre-molded plastic, carbon elements, polymers, metal components, and/or foam-type material.

Figure 4:
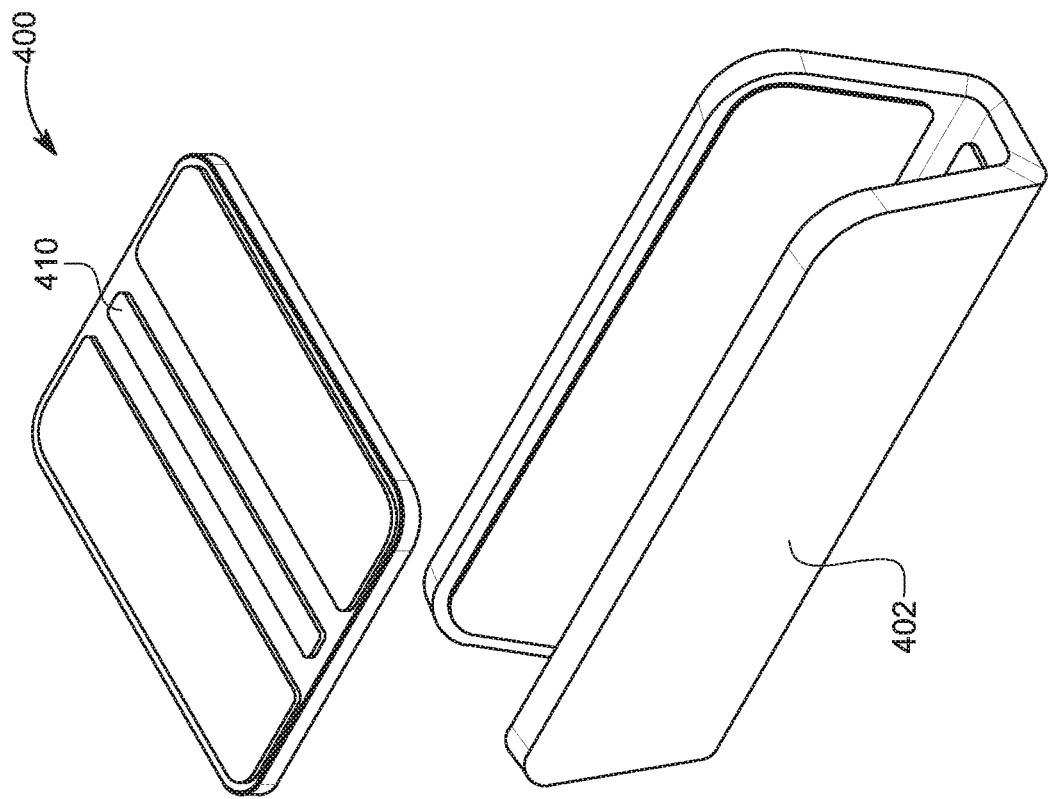
FIG. 4 provides schematic illustrations of an eyewear affixable cushioning device according to an embodiment.
Figure 4:
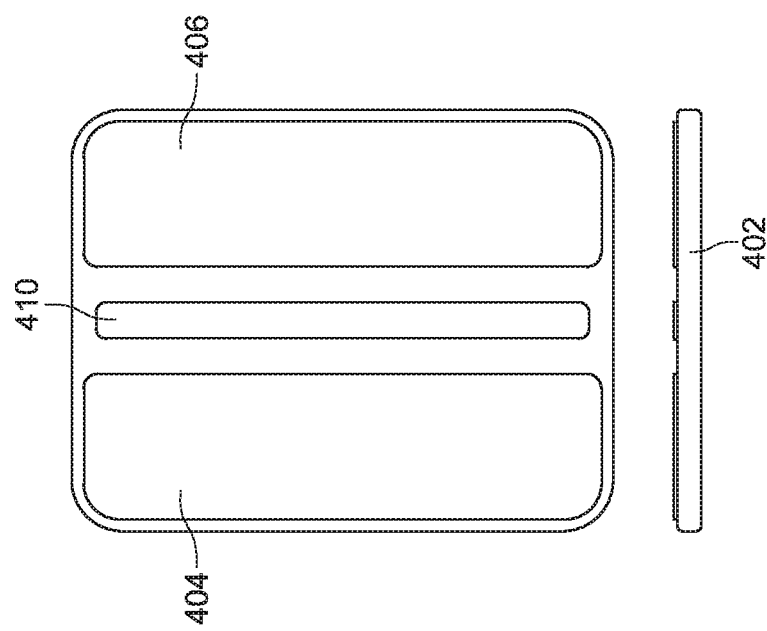

FIG. 4 provides schematic illustrations of an eyewear affixable cushioning device 400 according to an embodiment. This embodiment 400 represents a one piece design for each eyewear temple tip similar to the embodiment 200 shown in FIG. 2, where the glasses frames may be set upon a non-slip surface 410 shown in the diagram and the individual would close/seal the attachment onto the glasses frame through utilizing the sticky adhesive material (i.e., fasteners 404, 406) which may be apparent within the inside of the attachment. The adhesive material 404, 406 may allow the glasses attachment product to stick to the glasses frame on each side, in order to allow the attachment to remain firm and encompass the glasses frames. In terms of the material utilized, it can be a pre-molded plastic, carbon elements, polymers, metal components, and/or foam-type material.

Figure 5:
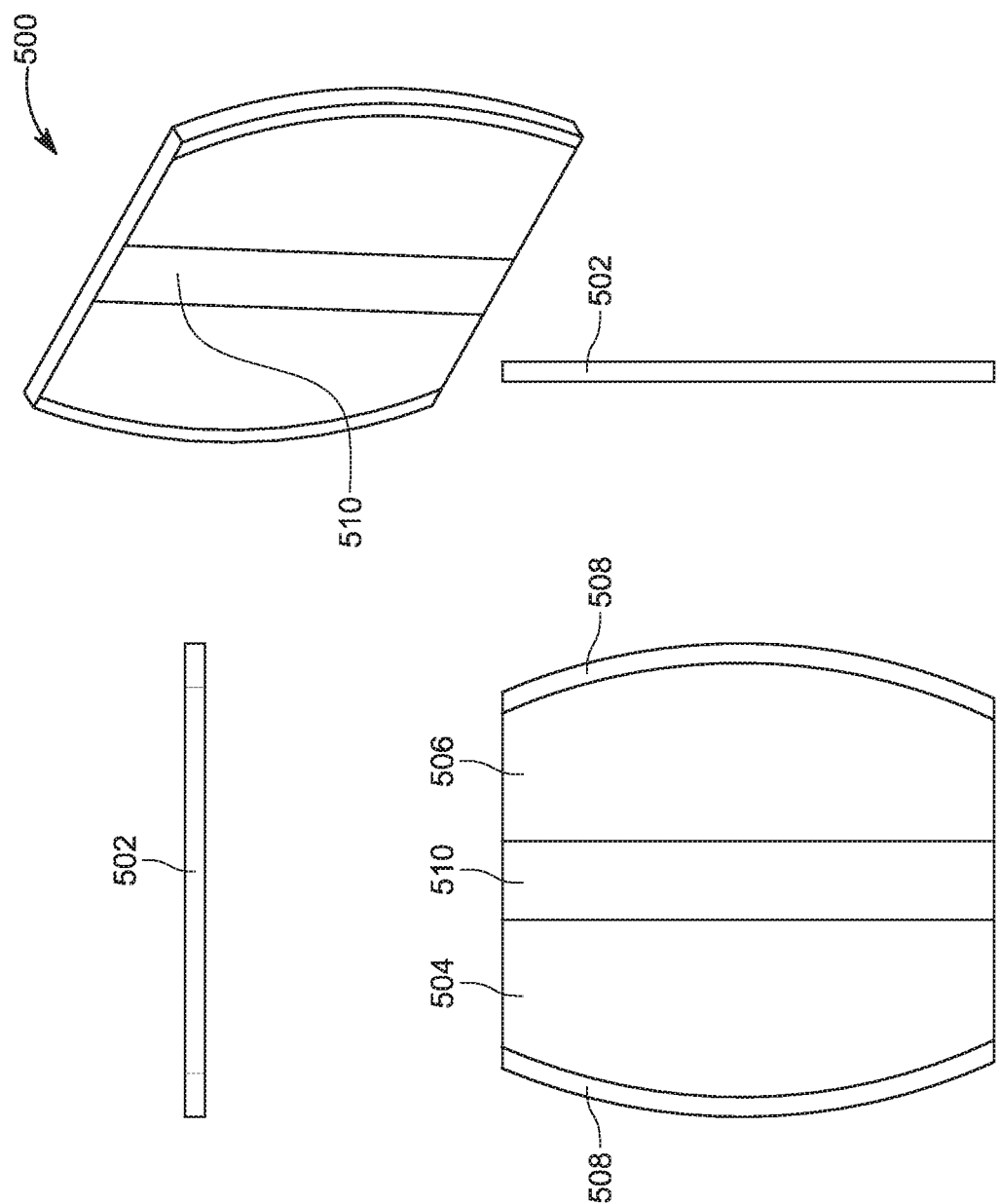
FIGS. 5 and 6 provide schematic illustrations of an eyewear affixable cushioning device according to an embodiment.
Figure 6:
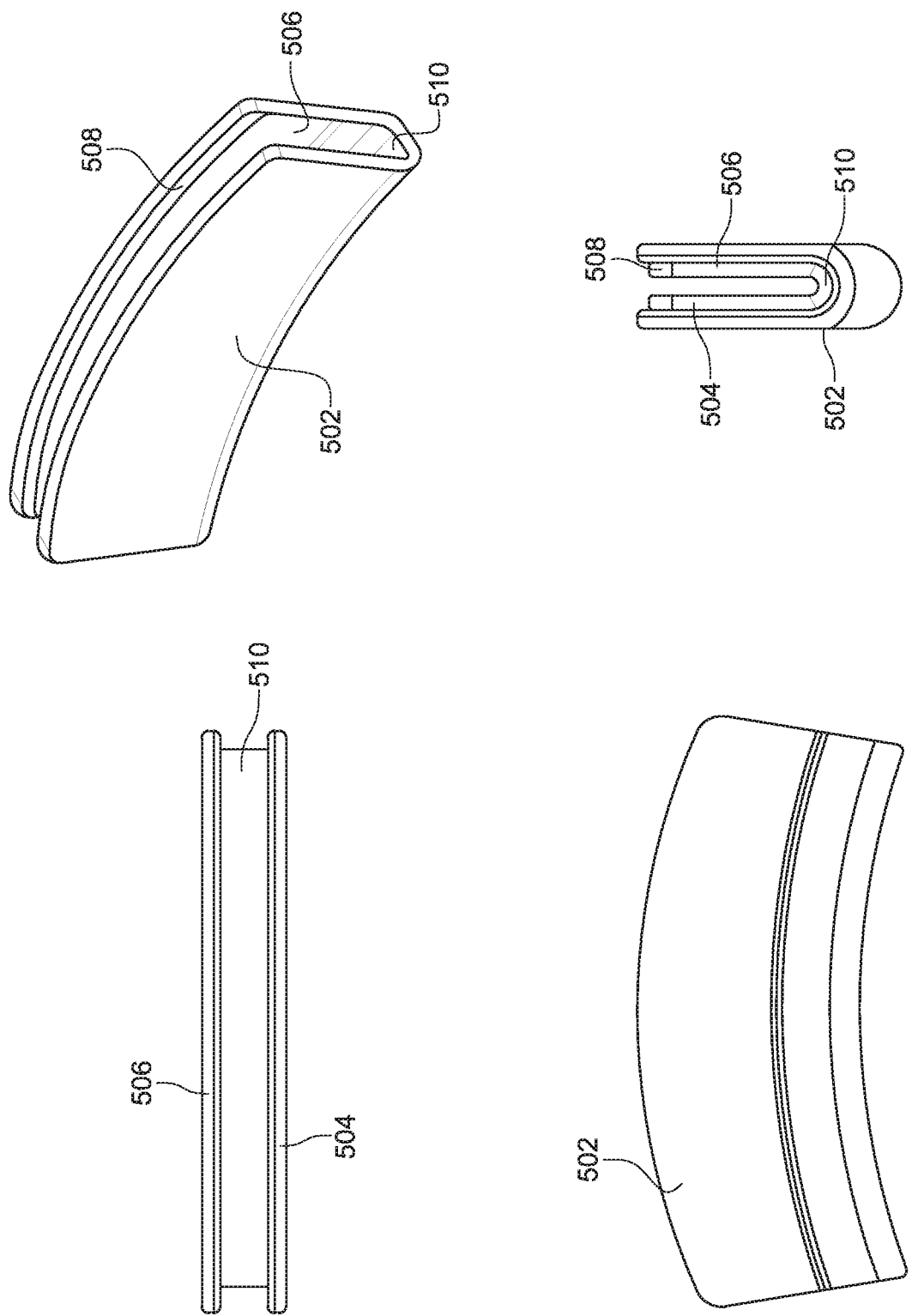
Figure 7:
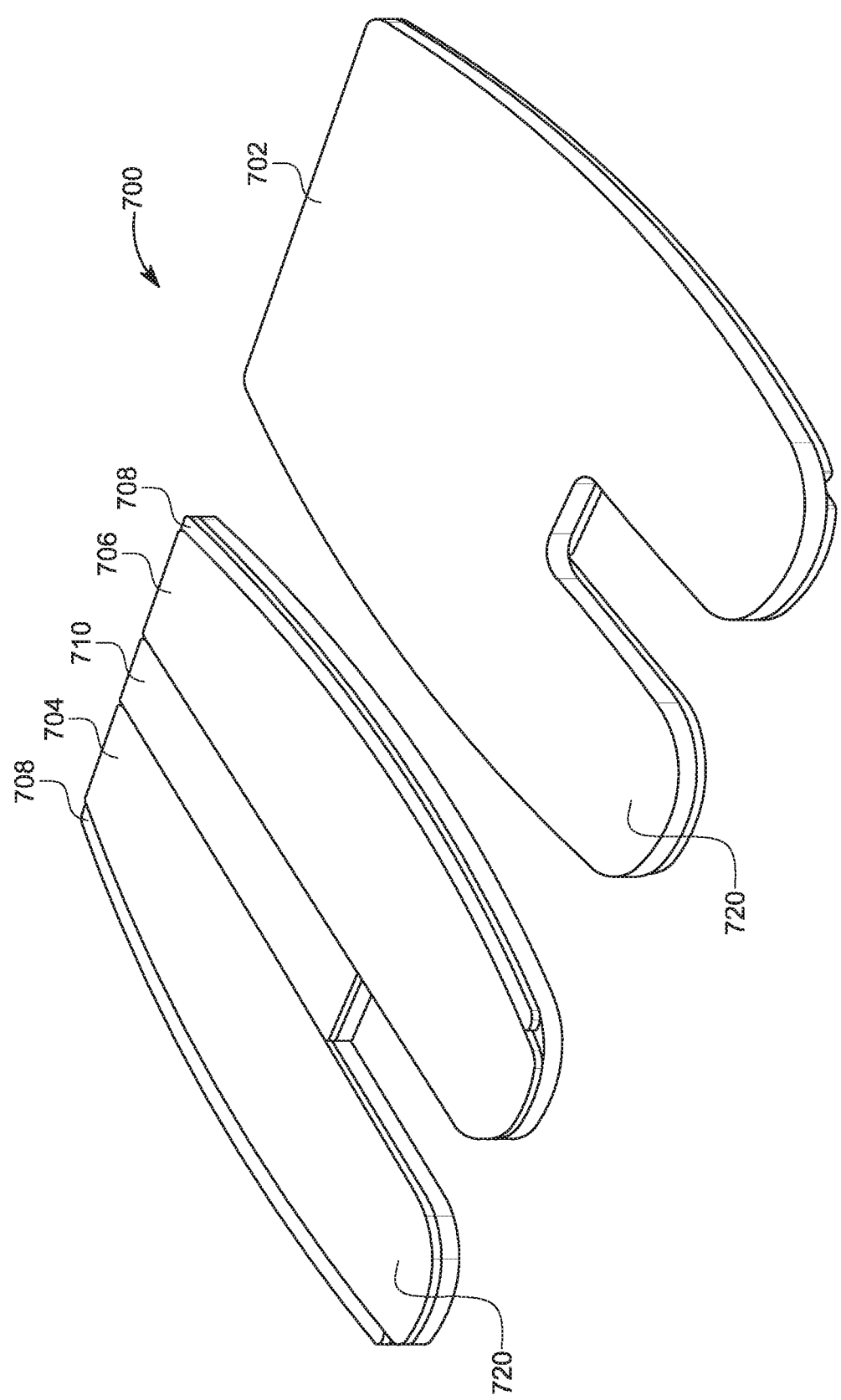
FIG. 7 provides schematic illustrations of an eyewear affixable cushioning device according to another embodiment.
Figure 8:
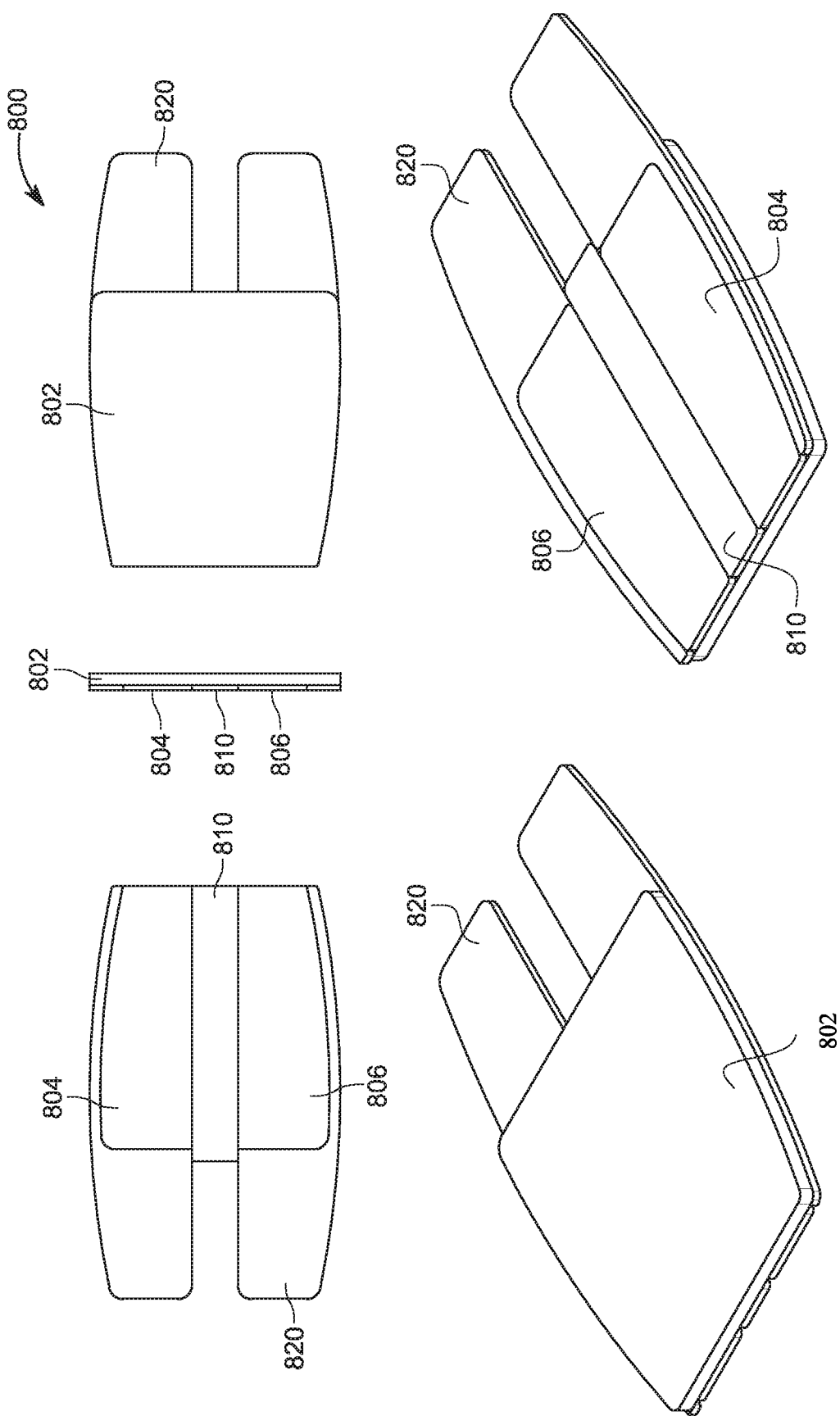
FIG. 8 provides schematic illustrations of an eyewear affixable cushioning device according to an embodiment.

FIGS. 5-8 include schematic illustrations of similar aspects of multiple example embodiments. More specifically, FIGS. 5 and 6 provide schematic illustrations of an eyewear affixable cushioning device 500 according to an embodiment. FIG. 7 provides schematic illustrations of an eyewear affixable cushioning device 700 according to another embodiment. FIG. 8 provides schematic illustrations of an eyewear affixable cushioning device 800 according to an embodiment.

An eyewear affixable cushioning device 500, 700, 800 according to an embodiment may include a base member 502, 702, 802, including a first area and a second area. The eyewear affixable cushioning device 500, 700, 800 may include a fastener 504/506, 704/706, 804/806 disposed on at least one of the first area and the second area of the base member 502, 702, 802. The eyewear affixable cushioning device may include a non-slip surface 510, 710, 810 being disposed on the base member 502, 702, 802. The base member 502, 702, 802 may include a compressible material, as described in further detail herein. The base member may be configured to receive a temple portion of the eyewear.

An eyewear affixable cushioning device system may include two of the eyewear affixable cushioning devices 500, 700, 800 (e.g., a pair of devices).

The base member 502, 702, 802 may be a cushioning material. An embodiment may include a cushioning soft material which may be made from a combination of materials or material that may be skin friendly to users and, while compressible in an absolute sense, also relatively firm (e.g., resistant to compression). For the base member 502, 702, 802, it may be desirable to utilize a foam which is relatively difficult or resistant to compression, but soft/skin friendly (in order to provide comfort to the user) because during product development, it has been duly noted from research that the product must be relatively thin in order to prevent outward pushing of the ear which may cause further issues. The product 500, 700, 800 may have enough stabilization and comfort in order to alleviate pain for the user when wearing glasses/headgear within about 8 mm (at the largest) or less of material. In order to have enough stabilization and shock absorption, a material may be needed which may be dense enough to provide sufficient stabilization as the product may need to be about 5 mm or less but soft enough to provide comfort and absorb the compression of the headgear (which is why the foam material is dense/hard to compress, which is optimized. Examples of foam that may be used include dense viscoelastic foam and/or cellular urethane foam. However, there are also other options with the foam and other elements described herein.

The eyewear affixable cushioning device may further include a skin material at least partially covering the base member 502, 702, 802, the skin material being moisture-wicking. The layer/outer core to coat the inner material (e.g., the base member 502, 702, 802) may be skin friendly and soft to ensure maximum comfortability and alleviate discomfort, but relatively moisture wicking as users may sweat while using the product and wearing headgear. The base member 502, 702, 802 may include a slip surface of the base member including a low coefficient of friction, the slip surface being disposed opposite to the non-slip surface when the base member is in an unfolded state. The skin material may at least partially cover the base member 502, 702, 802 and may form the slip surface of the base member including the low coefficient of friction.

A fastener 504/506, 704/706, 804/806 may include a hook and loop fastener, such as VELCRO. In other embodiments, the fastener can be a variety of other sealing mechanisms including but not limited to fastening materials as described elsewhere herein or as known in the art. For example, fastener can be embodied through a number of different types of sealers including but not limited to zippers, buttons, snaps and hook/loop fasteners (such as VELCRO which may be very thin). In an embodiment, material of the fastener 504/506, 704/706, 804/806 may start on the inside (when folded) of the base member 502, 702, 802 (adjacent to where a non-slip surface 510, 710, 810, which may be centered, may end). The sealing mechanism (e.g., fastener), which in an embodiment may be thin Velcro, may allow the user to seal up the device 500, 700, 800 to conform to virtually any eyewear frame regardless of the dimensions as the fastener may stop when it makes contact with the glasses frame.

The eyewear affixable cushioning device 500, 700, 800 may further comprise a non-slip member, the non-slip member forming the non-slip surface 510, 710, 810 of the base member 502, 702, 802. The non-slip surface and/or member may act as a pro-friction material that may be flexible, of low-shore hardness and relatively soft so that it may conform and bend with the base member 502, 702, 802 (e.g., the cushion) once the user affixes the device to his/her eyewear. The non-slip member 510, 710, 810 may be about 10 mm in width and less than or equal to about 1 mm in thickness. The non-slip material 510, 710, 810, which may be primarily at the bottom of the glasses frame (once affixed to glasses frame), may also be on the lower sides of the glasses frame (when folded), encompassing and pressing firmly into the frame to maximize an anti-slippage effect. In combination with the fastener 504/506, 704/706, 804/806, which may push the glasses frame into and/or against the non-slip surface 510, 710, 810 (which may also be wrapped around the frames)—the device exhibits a strong anti-slippage ability to prevent the device from slipping off of frames by accident (such as when a user pulls their glasses frames off their heads while wearing their headphones or any headgear). The non-slip material 510, 710, 810 may be affixed to the frame in the center (e.g., directly in the center) of the inside of the glasses attachment 500, 700, 800. This material may be about 5 mm to about 11 mm which may correspond to various/scale of glasses frames dimensions, which enables the anti-slippage material 510, 710, 810 to wrap around the glasses frames when folded upwards, it may or may not be but not the entire way based on the dimensions of the glasses frame. If it is a glasses frame that is on the thicker side, the fastener 504/506, 704/706, 804/806 may make up for the difference and seal up remaining space, depending on the thickness of the eyewear frames. In an embodiment, the non-slip surface 510, 710, 810 may be about 8 mm wide.

The eyewear affixable cushioning device 500, 700, 800 may further comprise an opener 508, 708, 808 adjacent to the fastener 504/506, 704/706, 804/806. In an embodiment, on the ends of the device, on the inside (when folded) of the first and second areas adjacent to where the faster 504/506, 704/706, 804/806 may end—there may be from about 1 mm to about 5 mm of material (e.g., opener) which is preferably non or low-slip (e.g., "grippy") so that users may use their fingers or another device to open the device, remove the frames if applicable, and to store device for a later usage point.

The device (e.g., the base member 502, 702, 802) may include curved edges on one or more ends. Accordingly, when users affix the device to their eyewear frames, the device may correspond to the curvature of the eyeglass frames.

The eyewear affixable cushioning device may include a flap 720, 820 extending from at least one of the first area and the second area of the bases member 502, 702, 802. The flap 720, 820 may include indicia. For example, the flap 720, 820 may include branding such as a logo, and may be configured to show even when the device is in use by a user having headphones or other head gear partially covering the device. The flaps 720, 820 may also have an additional gripping capability to the glasses frame to prevent slippage, depending on the structure, measurements and curvature of the frame.

The base member 502, 702, 802 may comprise a foldable area between the first area and the second area (e.g., between the fasteners 504/506, 704/706, 804/806). The non-slip surface 510, 710, 810 may be disposed on the foldable area of the base member. This design may be desirable for manufacturing as the device may be a flat device and may not require a mold to create the product.

For manufacturing feasibility, this device may be made flat from a cut piece and may have the additional features/materials affixed onto the device (through a variety of possible means including but not limited to stitching, forms of gluing, laminating etc.) Forming the product into a flat piece which users may affix to their eyewear frames may minimize product costs, may eliminate a need for a mold, as well as account for ease of packaging (for smaller packages) and simpler logistics as well as operational efforts.

According to an embodiment, a method of manufacturing an eyewear affixable cushioning device may be provided. The method may include operations for accomplishing the features set forth herein. For example, the method may include disposing a fastener on at least one of a first area and a second area of a foldable base member. The method may include disposing a "grippy material" on the first and second areas to act as an opener. The foldable base member may include a compressible material.

According to embodiments, a universal/adjustable to virtually all eyewear frames clip-on cushioned attachment may be provided, that is, eyewear affixable cushioning devices, systems and methods may be provided. The eyewear affixable cushion may alleviate user discomfort (particularly to the back of the ear and temple) when wearing a form of headgear (which may include over/on the ear headphones, helmets, earmuffs, beanies, and the like). Additional benefits are provided herein.

Embodiments have been disclosed herein, and although terms are employed, they are used and are to be interpreted in a generic and descriptive sense only and not for purpose of limitation. In some instances, as would be apparent by one of ordinary skill in the art, features and characteristics described in connection with an embodiment may be used singly or in combination with features and characteristics described in connection with other embodiments unless otherwise specifically indicated. Accordingly, it will be understood by those of ordinary skill in the art that various changes in form and details may be made without departing from the spirit and scope of the disclosure as set forth herein.

What is claimed is:

1. An eyewear affixable cushioning device, comprising:
   a base member including a first area configured for placement on a first side of a temple portion of eyewear and a second area configured for placement on a second side of the temple portion of the eyewear;
   a fastener disposed on at least one of the first area and the second area of the base member;
   a non-slip surface being disposed on the base member and configured to directly contact the temple portion of the eyewear;
   a slip surface of the base member, the slip surface including a low coefficient of friction; and
   a foldable area between the first area and the second area, wherein
   the base member includes a compressible material, and
   the low coefficient of friction of the slip surface is lower than a coefficient of friction of the non-slip surface.

2. The eyewear affixable cushioning device of claim 1, wherein the non-slip surface is disposed on the foldable area of the base member.

3. The eyewear affixable cushioning device of claim 2, further comprising a non-slip member, the non-slip member forming the non-slip surface of the base member.

4. The eyewear affixable cushioning device of claim 2, wherein the non-slip surface is about 5 mm to about 11 mm wide.

5. The eyewear affixable cushioning device of claim 1, further comprising a skin material at least partially covering the base member, the skin material being moisture-wicking.

6. The eyewear affixable cushioning device of claim 1, wherein the slip surface is disposed opposite to the non-slip surface when the base member is in an unfolded state.

7. The eyewear affixable cushioning device of claim 6, further comprising a skin material at least partially covering the base member, the skin material forming the slip surface of the base member including the low coefficient of friction.

8. The eyewear affixable cushioning device of claim 1, wherein the compressible material comprises a foam.

9. The eyewear affixable cushioning device of claim 1, wherein the fastener comprises a hook-and-loop fastener, a hook portion being disposed on one of the first and second areas, and a loop portion being disposed on another of the first and second areas.

10. An eyewear affixable cushioning device system, comprising:
    two eyewear affixable cushioning devices, each including:
    a base member including a first area configured for placement on a first side of a temple portion of eyewear and a second area configured for placement on a second side of the temple portion of the eyewear;
    a fastener disposed on at least one of the first area and the second area of the base member;
    a non-slip surface being disposed on the base member and configured to directly contact the temple portion of the eyewear;
    a slip surface of the base member, the slip surface including a low coefficient of friction; and
    a foldable area between the first area and the second area, wherein,
    the base member includes a compressible material, and
    the low coefficient of friction of the slip surface is lower than a coefficient of friction of the non-slip surface.

11. The eyewear affixable cushioning device system of claim 10, wherein the non-slip surface is disposed on the foldable area of the base member.

12. A method of manufacturing an eyewear affixable cushioning device, comprising:
    disposing a fastener on at least one of a first area configured for placement on a first side of a temple portion of eyewear and a second area configured for placement on a second side of the temple portion of the eyewear, the first area and the second area being of a foldable base member;
    disposing a non-slip surface on the foldable base member, the non-slip surface being configured to directly contact the temple portion of the eyewear; and
    disposing a slip surface on the base member, the slip surface including a low coefficient of friction, wherein
    the foldable base member includes a compressible material, and
    the low coefficient of friction being lower than a coefficient of friction of the non-slip surface.

* * * * *